United States Patent [19]

Giolitti et al.

[11] 3,872,468

[45] Mar. 18, 1975

[54] KEYBOARD FOR CALCULATING, ACCOUNTING AND OTHER OFFICE MACHINES

[75] Inventors: Nicolò Giolitti; Dante Daly; Lorenzo Bertino, all of Ivrea, Turin, Italy

[73] Assignee: Ing. C. Olivetti & C., S.p.A., Ivrea (Turin), Italy

[22] Filed: Apr. 24, 1973

[21] Appl. No.: 354,052

[30] Foreign Application Priority Data

Apr. 28, 1972 Italy .......................................... 68316

[52] U.S. Cl. ........... 340/365 R, 340/365 E, 200/5 B

[51] Int. Cl. .............................................. H04l 15/06

[58] Field of Search .......... 340/365 S, 365 E, 365 R

[56] References Cited

UNITED STATES PATENTS

| | | | |
|---|---|---|---|
| 3,456,077 | 7/1969 | Jones | 340/365 E |
| 3,466,647 | 9/1969 | Guzak | 340/365 E |
| 3,491,337 | 1/1970 | Guzak | 340/365 S |
| 3,530,239 | 9/1970 | Corell | 340/365 S |

*Primary Examiner*—Thomas B. Habecker
*Attorney, Agent, or Firm*—I. J. Schaefer

[57] ABSTRACT

Keyboard for calculating, accounting and other office machines, comprising a series of keys each connected to a corresponding setting element and a series of code bars associated with a series of switching means. The code bars are shiftable by the setting elements in a first or a second position and restoring means cooperate with the bars for positioning the code bars at rest in a position intermediate between the first and second position in order to cause the bars to be shifted by the same amount by the setting element on the depression of any key. The switching means generate a setting-in signal when the bars are positioned by said setting element and connected to a pulse shaper to generate a start pulse of shape independent of the setting-in signal.

8 Claims, 16 Drawing Figures

PATENTED MAR 18 1975

3,872,468

KEYBOARD FOR CALCULATING, ACCOUNTING AND OTHER OFFICE MACHINES

BACKGROUND OF THE INVENTION

The present invention relates to a keyboard for calculating, accounting and other office machines, in which on the depression of each key a corresponding setting element selectively positions each one of a series od code bars in a first or a second position in such manner as to generate a code combination corresponding to the depressed key.

In known keyboards of this type, each depressed key acts through the medium of a corresponding setting element on cam profiles of a series of code bars to leave the individual bars in the existing position or to shift them through a given stroke into a new position, so as to actuate an input device (constituted by electrical contacts or by mechanical entering means). The work expended is therefore proportional to the working stroke of the individual bars and to the number of bars shifted by the setting element. The return springs or the setting elements must be proportioned to overcome considerable friction and therefore the entering speed of the keyboard proves to be limited. Moreover, the pressure for depressing each individual key is not constant, but varies as a function of the number of code bars actuated to generate a code combination.

SUMMARY OF THE INVENTION

The main object of the present invention is to provide a keyboard for calculating, accounting and other office machines in which the setting work is reduced to the minimum and in which the setting elements can actuate the code bars under the same kinematic conditions.

Another object of the present invention is to provide a key-board for electronic machine, wherein is avoided the entering of erroneous input signals.

According to the present invention, there is provided a keyboard for calculating, accounting, and other office machines, comprising a series of keys, each connected to a corresponding setting element, a series of code bars shiftable by said setting elements in a first or a second position in such manner as to generate a code combination corresponding to the depressed key, and restoring means cooperating with said bars for positioning said code bars at rest in a position intermediate between said first and second positions, in order to cause each of such bars to be shifted by the same amount by said setting element on the depression of any key.

The keyboard includes a setting-in bar for reading the condition of switching means associated to the code bars. The setting-in bar is held in a inoperative condition by a positioning element shiftable by the keys, when depressed.

A preferred embodiment of the invention is presented by way of example in the following description and shown in the accompanying drawings.

DETAILED DESCRIPTION OF THE INVENTION

Numeric and function keys

Figures 1, 2:
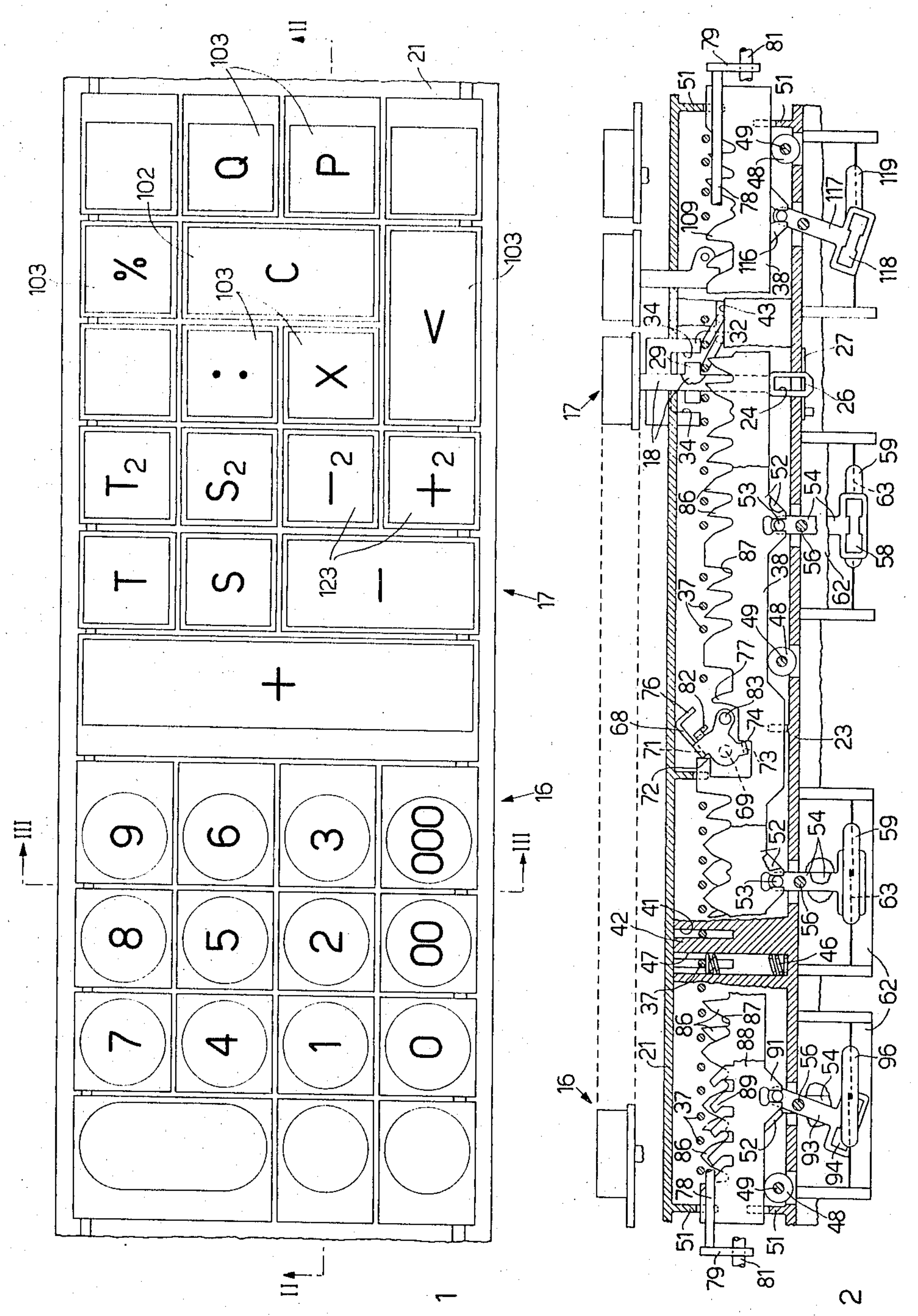
FIG. 1 is a plan view of a keyboard embodying the invention.
FIG. 2 is a partial section of the keyboard taken on the line II—II of FIG. 1.
Figure 3:
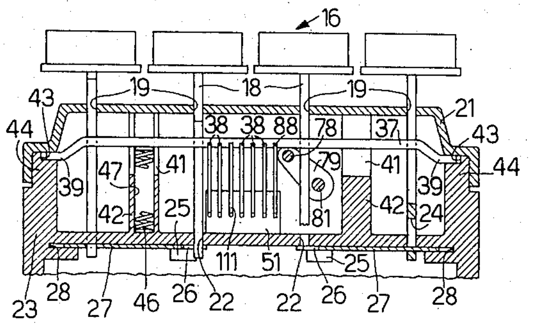
FIG. 3 is a partial section of the keyboard taken on the line III—III of FIG. 1.
Figure 4:
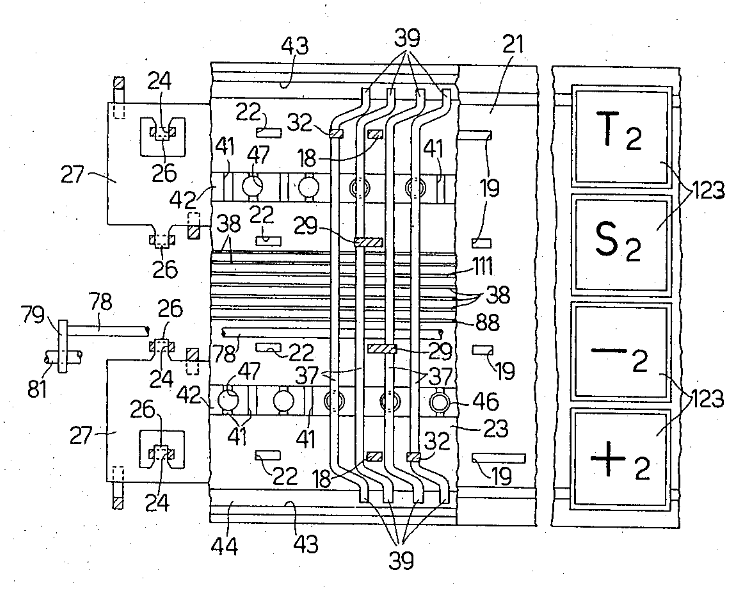
FIG. 4 is a partial plan view, partly in section, of the keyboard of FIG. 1.

The keyboard is fitted to an electronic calculating machine and comprises at set of twelve numeric keys 16 (FIG. 1) and a set of function keys 17. The keys 16, 17 are arranged generally in a pattern of four rows and a number of columns, although some keys span more than one row or more than one column. Each key is carried by a shank 18 (FIG. 3). The shanks 18 of each column are slidable vertically, being each guided by an upper slot 19 in a cover 21 and by a lower slot 22 in a support 23. Each shank 18 has a window or slot 24 (FIG. 2) adapted to accommodate a resilient lug 26 (FIG. 4) of a key-locking plate 27. Each plate 27 is housed in a longitudinal groove 28 (FIG. 3) of a series of projections 25 of the support 23.

The shanks 18 are divided into two groups: those of the first group have a projection 29 (FIG. 2) extending from the shank itself, while those of the second group have a projection 32 spaced from the shank by a gap 34 which is in correspondence with the projection 29. Of the four shanks 18 of a column of keys two have the projection 29, one facing left and the other right (FIG. 2), and two have the projections 32, again one facing left and the other facing right. In each case one shank is turned through 180° with respect to the other of the same group. The keys are therefore carried by only two types of shank 18, so that the construction of the keyboard is simplified.

The keyboard comprises a series of setting elements each constituted by a shaped wire 37 (FIG. 4) having a substantially rectilinear central portion adapted to co-operate with a series of five code bars 38 and with the projections 29 and 32 of the shanks 18 (FIG. 3). The wires 37 are disposed perpendicularly with respect to the bars 38 and each wire has its two ends 39 cranked.

Each wire 37 (FIGS. 3 and 4) is guided vertically by the rectilinear central portion in two slots 41 formed in two upright walls 42 of the support 23. Moreover, the ends 39 of each wire are trapped in two grooves 43 formed by the sides 44 of the support 23 and by the bottom edge of the cover 21. The grooves 43 are parallel to the plane of movement of the bars 38.

A spring 46 housed in a hole 47 (FIG. 4) formed in the upright wall 42 in coincidence with the corresponding slot 41 holds the respective wire 37 (FIG. 2) against the corresponding projections 29, 32 of each shank 18. Therefore, each shank 18 is held by the respective spring 46 in the inoperative position and arrested with the bottom part of the slot 24 against the resilient lug 26 of the key-locking plate 27.

Figure 5:
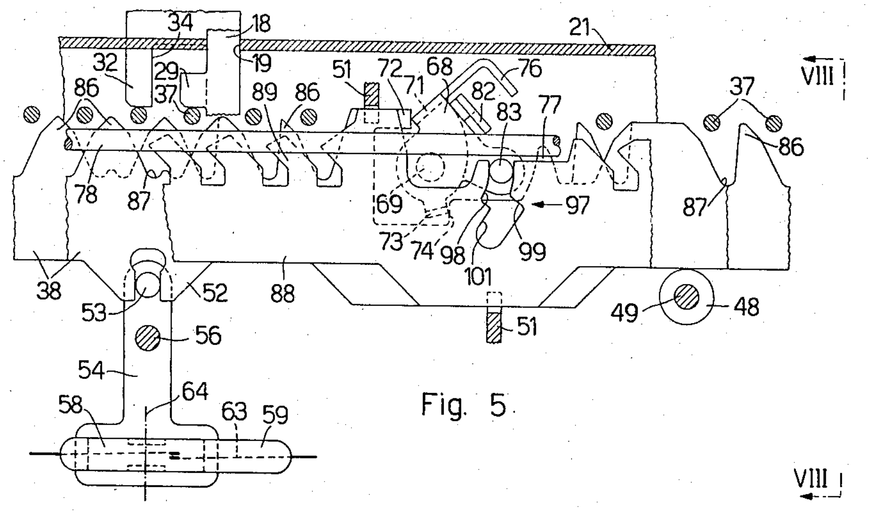
FIG. 5 shows a detail of FIG. 2 on a larger scale.

The code bars 38 are constituted by sliders of eleongated form which are slidable on rollers 48 rotatable on fixed pins 49 and are guided laterally and at the top by a series of combs 51. Each bar or slider 38 has a fork 52 (FIG. 5) adapted to co-operate with a pine 53 of a lever 54. The levers 54 are pivoted in pairs on fixed pins 56 and each of them carries a permanent magnet 58 acting on a proximity switch 59 of the sealed reed type which is constituted by a capsule fixed to the support 23 and within which there are arranged two contact tongues 63 sensitive to the magnetic flux.

To prevent a sealed reed switch 59 (FIG. 8) being affected by the permanent magnet of the adjoining lever, a screen 62 is interposed between one lever and the other. Each sealed reed switch 59 (FIG. 5) is arranged with respect to the magnet 58 so that the tongues 63 are displaced to the right in FIG. 5 with respect to the axis 64 of the magnet 58.

Figure 8:
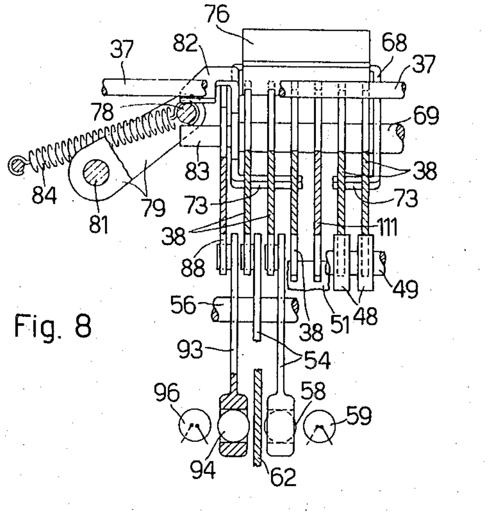
FIG. 8 is a partial section taken on the line VIII—VIII of FIG. 5.

The sliders 38 are held at rest by a restoring element controlled by a common member. The restoring element is constituted by a bail 68 (FIG. 8) pivoting on a shaft 69 perpendicular to the sliders 38. The bail 68 comprises a cross-piece 71 (FIG. 5) adapted to co-operate with an upper shoulder 72 of each slider 38, and two lugs 73 each adapted to co-operate with a lower shoulder 74 of a corresponding group of sliders 38 (FIG. 8). The bail 68 moreover comprises a stop element constituted by a bent portion 76 (FIG. 5) of the cross-piece 71, which is normally inoperative and is adapted to co-operate with projections 77 of the sliders 38 to prevent movement of the sliders 38 in an operative phase.

The common member controlling the bail 68 is constituted by a bar 78 (FIG. 8) rigidly connected to two levers 79 pivoted at 81. The bar 78 is sparallel to the sliders 38 and disposed below the wires 37 and is adapted to be lowered by each of them. The bar 78 moreover co-operates with a lug 82 of the bail 68 and with a positioning pin 83 fixed to the bail 68. A spring 84 connected to the bar 78 tends to cause it to turn anticlockwise. The tension of the spring 84 is such that, at rest, the bar 78 bears against the lug 82 and holds the bail 68 (FIG. 5) turned anticlockwise with the cross-piece 71 and the lugs 73 arrested against the shoulders 72 and 74 of the sliders 38, so that these sliders are at rest or inoperative in an intermediate position.

The sliders 38 have on their upper edge a series of code cams 86 adapted to co-operate with the setting elements 37. The cams 86 have a substantially constant inclination with respect to the stroke of the setting elements 37 and terminate in an edge 87 adapted to accommodate the said setting elements. The cams 86 are oriented, some to the left and some to the right with respect to the stroke of the setting elements 37, so that each cam can shift the respective slider positively from the inoperative position to the right into a first working position, or to the left into a second working position, according to a given coding. In the first working position, the magnet 58 holds the contacts of the corresponding sealed reed switch 59 open, while in the second working position these contacts are closed.

Beside the sliders 38 is disposed a setting-in bar 88 slidable on the rollers 48 and guided laterally and at the top by the combs 51. The bar 88 has a series of cams 89 with a substantially constant inclination with respect to the stroke of the setting elements 37, with which the cams are adapted to co-operate. The cams 89 are all directed to the right, so that the bar 88 can be shifted positively to the left in FIG. 5 from the inoperative position to the working position. The bar 88 has a fork 91 (FIG. 2) adapted to co-operative with a lever 93 bearing a permanent magnet 94. The magnet 94 acts on a sealed reed switch 96 fixed to the support 23. The lever 93 is normally inclined with respect to the axis of the reed switch 96, so that the magnet 94 holds the contacts of the reed switch 96 normally open and closes them only when the bar 88 is shifted to the left into the working position.

The profiles of the cams 86 of the sliders 38 and those of the cams 89 of the introduction bar 88 are such that the sliders 38 are positioned before the setting-in bar 88 is positioned, in order that the sliders 38 may already be located in one of the two working positions when the setting-in bar 88 reaches the working position.

The setting-in bar 88 is provided with a cam slot 97 (FIG. 5) normally engaged by the positioning pin 83, which thus retains the bar 88 in the inoperative position in a positive manner. The slot 97 has a first arcuate profile 98 substantially concentric with the axis of rotation of the bail 68, so that the bar 88 is held positively in the inoperative position by the positioning pin 83 also during the initial stroke of the setting elements 37 for the positioning of the sliders 38. A second profile 99 substantially perpendicular to the profile 98 is adapted to co-operate with the positioning pin or element 83 when the bar 88 is shifted to the left to bring the bar back rapidly to the inoperative position during the release of the setting element 37. Finally, the slot 97 has a third profile 101 which co-operates with the positioning pin 83 to hold the bar 88 positively in the working position at the end of the stroke of the setting elements 37.

The keyboard described operates in the following manner.

On depression of any one of the keys 16, 17 (FIG. 2), the corresponding shank 18 is lowered and lowers the respective wire 37 by means of the projection 29 or 32 in opposition to the action of the respective spring 46 (FIG. 3). The wire 37 is lowered vertically, guided in the slots 41, sliding and turning by means of the ends 39 in the grooves 43, and bears on the bar 78. The bar 78 (FIG. 8) is now rotated clockwise in opposition to the action of the spring 84 and, acting on the positioning pin 83, causes the bail 68 (FIG. 5) to turn clockwise on the shaft 69. As soon as the bail 68 begins this turning action, the cross-piece 71 and the lugs 73 leave the shoulders 72 and 74 respectively, of the sliders 38, which are thus free to be positioned.

Figure 6:
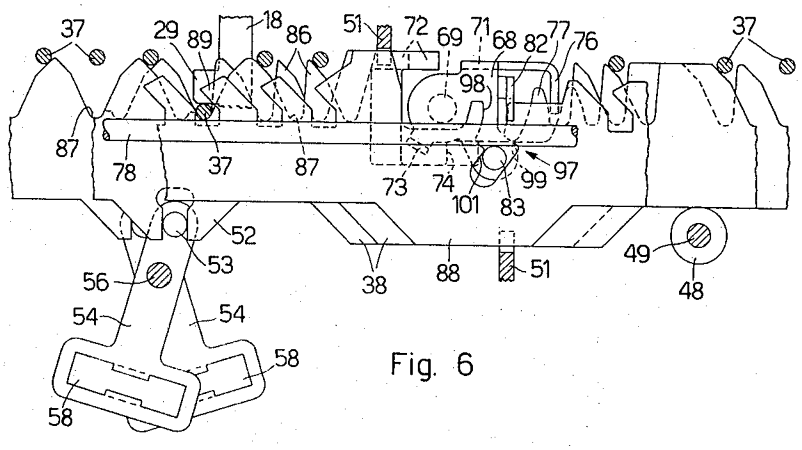
FIG. 6 shows the detail of FIG. 5 in an operative position.

The wire 37 now engages the cams 86 of the sliders 38, initiating the positive positioning thereof, partly to the right and partly to the left according to the code of the depressed key. In the initial phase of its turning action, the bail 68 holds the positioning pin 83 in engagement with the profile 98 of the slot 97, as a result of which the setting-in bar 88 is held positively in the inoperative position during the initial stroke or travel of the wire 37. Before the wire 37 engages the cam 89 of the bar 88, the positioning pin 83 leaves the profile 98 and engages the profile 99, so that the bar 88 is free to be positioned. The wire 37 then begins to position the bar 88 positively, while the sliders 38 are almost at the end of their stroke. The depression of the key 16, 17 being continued, the sliders 38 and the bar 88 are positioned positively in the working position, as shown in FIG. 6, until the wire 37 is arrested against the edge 87 of the sliders 38. The positioning pin 83, engaging the profile 101, now keeps the bar 88 positioned positively in the working position. Moreover, the bent portion 76 of the bail 68 is disposed in the path of the projections 77. The cams of the sliders 38 are disposed in the path of movement of the other wires 37 which have not been set and prevent actuation thereof.

Figure 9:
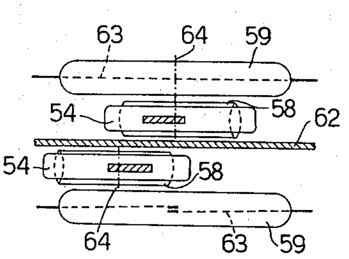
FIG. 9 is a partial plan view of a detail of FIG. 5 in the operative position of FIG. 6.

The sliders 38 positioned to the right swing the levers 54 clockwise through the medium of the forks 52, as a result of which the axis 64 (FIG. 5) of the magnets 58 moves away from the respective reed switches 59 and the contacts 63 are opened. The sliders 38 positioned to the left swing the magnets 58 anticlockwise, as a result of which they close the contacts of the reed switches 59, as shown in FIG. 9. Only after the setting of the reed switches 59, is the reed switch 96 (FIG. 2) of the setting-in bar 88 closed, which permits the introduction of the electric signals which will be read in known manner by the electronic controller of the calculating machine to which the keyboard is fitted.

The depressed key 16, 17 can now be released. The spring 46 rapidly raises the wire 37 with the respective shank 18, until the latter is arrested by the bottom part of the slot 24 against the resilient lug 26 of the keylocking plate 27. In this stage, the bent portion 76 of the bail 68, holding the bars 38 in the working position, prevents changes of state of the reed switches 59. Moreover, the spring 84 (FIG. 8) causes the levers 79 to swing anticlockwise. Through the lug 82, the bar 78 turns the bail 68 (FIG. 6), also anticlockwise. The positioning pin 83 ceases it engagement with the profile 101 and engages the profile 99, as a result of which it shifts the setting-in bar 88 rapidly to the right to bring it back into the initial inoperative position.

Before the bail 68 begins the restoration of the sliders 38, the setting-in bar 88 is brought back to the inoperative position and held therein by the positioning pin 83, which engages the profile 98. The setting-in bar 88 (FIG. 2) then brings the lever 93 back into the initial position, re-opening the contacts of the reed switch 96 by means of the magnet 94.

In the event of the sliders 38 (FIG. 6) not effecting return to the intermediate position owing to laziness or slacking of the spring 84 or to other abnormal functioning, the bent portion 76 bears against the projections 77 and prevents a different positioning of the sliders.

The sliders 38 therefore remain locked, it is not possible to depress another key and the introduction of undesired data is prevented until the setting-in bar 88 has returned to the inoperative position.

With the bar 88 now in the inoperative position, the bail 68 turning anticlockwise, engages by means of the cross-piece 71 the shoulders 72 of those sliders 38 which have been shifted to the right and by means of the lugs 73 the shoulders 74 of those sliders 38 which have been shifted to the left, initiating the return of the sliders 38 towards the inoperative position. The spring 84 (FIG. 8) continues to cause the bar 78 and the bail 68 (FIG. 5) to swing anticlockwise until the bail 68 arrests the cross-piece 71 against the shoulders 72 and the lugs 73 against the shoulders 74 of the sliders 38. Together with the sliders 38 there also return to the inoperative position the respective levers 54 and the permanent magnets 58 which may or may not change over the respective reed switches. This does not affect the controller of the calculator, because the reading of the reed switches 59 is effected only during the closing of the reed switch 96. The keyboard thus has all the devices freshly in the inoperative position and it is therefore possible to actuate a key again.

Figure 7:
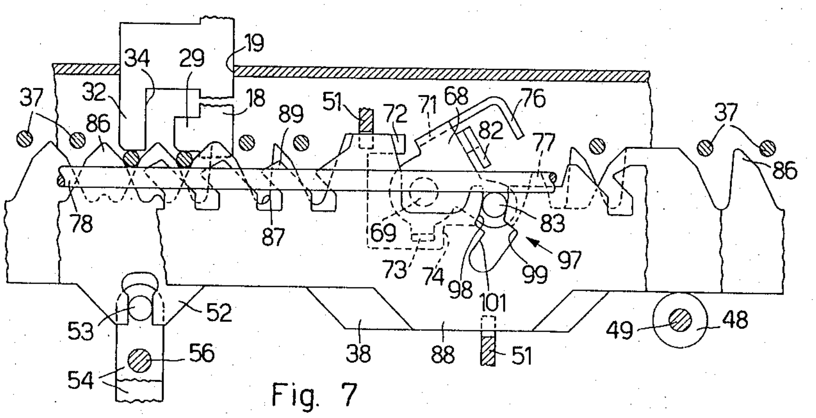
FIG. 7 shows the detail of FIG. 5 in another operative position.

Simultaneous accidental actuation of two keys causes the lowering of the two corresponding wires 37 (FIG. 7) and of the bar 78. The bail 68 releases the sliders 38, but since at least one slider 38 must be shifted simulaneously to the right and to the left, the wires 37 cannot complete their stroke. It is therefore not possible to position the setting-in bar 88, as a result of which no data is introduced into the controller of the calculator. On continuing to act on the two keys, only a bending of the wires 37 will be obtained, but not the positioning of the sliders 38. On releasing the keys, the springs 84 and 46 bring all the parts back to the inoperative position, as already described hereinbefore.

It is therefore obvious that the code bars 38 are held inoperative in an intermediate position by the restoring element 68 controlled by the common member 78 between the first working position located to the right and the second working position located to the left. Each bar 38 is moreover shifted by the same amount by the setting element 37 on the depression of any one of the keys 16, 17.

Data retrievel key

In a calculating machine, the problem of actuating given groups of keys at the same time is sometimes posed. For example, to carry out an operation on a result stored in a register of the machine, it is necessary to actuate at the same time the key corresponding to the operation to be effected and a key which retrives this result.

The function keys 17 (FIG. 1) include a group of function keys 103 and an additional key 102 marked with the symbol C, which is used to select a given register off the machine which contain a certain item of data. The key 102 is arranged adjacent the multiplication and division keys 103 marked with the symbols X and ÷ and adjacent another two keys 103 marked with the symbols P and Q which command a mulitplication and division operation with accumulation of the corresponding results in a given register. Finally, adjacent the key 102 there are disposed a key 103 marked with the symbol percent for the calculation of percentages and a key 103 marked with the symbol $<$ for commanding the input of the first operand of an operation.

The key 102 is carried by a shank 104 (FIG. 10) alike at the bottom to the shanks 18 carrying the keys 16 and 17. The shank 104 is slidable vertically in the slots 19 and 22 is held in the inoperative position by a spring 106 (FIG. 11) with the bottom part of the slot 24 (FIG. 10) against the resilient lug 26 of the key-locking plate 27. The shank 104 differs from the shanks 18, since it has at the top a projection 107 to which a pin 108 is fixed. This pin is adapted to co-operate with a cam 109 of a series of cams formed by the upper edge of an additional bar 111. The bar 111, similarly to the code bars 38, is slidable on the rollers 48 and guided by the combs 51. Like the setting-in bar 88, the bar 111 can be set only to the left in the drawing, but is not controlled either by the cross-piece 71 or by the lugs 73 of the bail 68.

Figure 10:
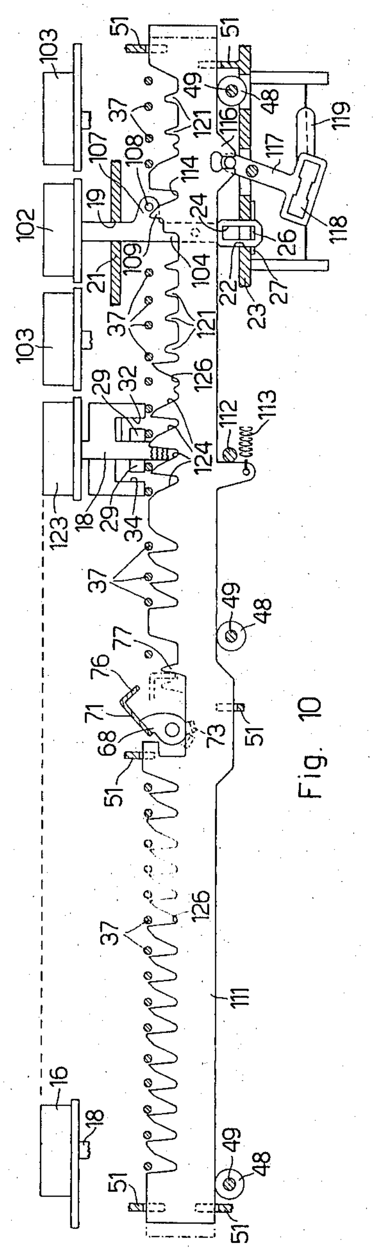
FIG. 10 shows another detail of FIG. 2.
Figure 11:
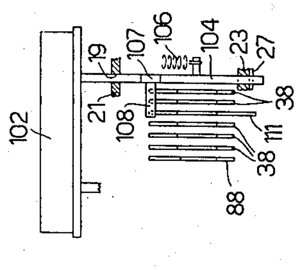
FIG. 11 is a side view of the detail of FIG. 10.

The bar 111 is held at rest against a stop 112 by a spring 113 in a first position shifted to the right in FIG. 10. On depressing the key 102, the pin 108 acts on the cam 109, shifting the bar 111 to the left in opposition to the action of the spring 113 into a second position, until the pin 108 is arrested against the cam bottom 114. A fork 116 causes a lever 117 to swing anticlockwise and, through the medium of a permanent magnet 118, this lever closes the normally open contacts of a sealed reed switch 119. Since the key 102 does not act on the setting-in bar 88, no setting of data into the electronic controller of the calculator is produced.

The bar 111 is also provided with a projection 77. FIG. 10 shows in chain-dotted lines both the bail 68 and the bar 111 in the second position shifted to the left, and it is obvious from this that the projection 77 is adapted to co-operate with the bent portion 76 of the bail 68, when lowered, both in the first and in the second working position of the bar 111 to maintain the closing or opening of the reed switch 119, thus preventing undesired changes of state.

The operations commanded by the keys 103 (FIG. 1) may be carried out on data entered through the medium of the numeric keys 16 or on the data contained in a given register. In the first case, the bar 111 (FIG. 10) remains in the rest position with the contacts of the reed switch 119 open. In the second case, the key 102 is depressed together with the key 103 for the desired operation and closes the contacts of the reed switch 119 as described hereinafter.

The bar 111 has six projections 121 similar to the cams 86 but of lower height, which are arranged below and shifted slightly to the right with respect to the setting elements 37 corresponding to the six keys 103 and with which they do not interfere when these keys are depressed.

On simultaneously depressing the key 102 and one of the six keys 103, the bar 111 is shifted to the left in FIG. 10 by the pin 108 and closes the reed switch 119. The setting element 37 corresponding to the key 103 depressed sets the sliders 38 and the setting-in bar 88 as described hereinbefore. This combination is therefore read by the electronic controller of the calculator with the contacts of the reed switch 119 closed.

By depressing only one of the six keys 103, the corresponding setting element 37 positions the sliders 38 and the setting-in bar 88 is disposed to the left of the respective projection 121, leaving the bar 111 at rest. This combination is therefore now read by the controller of the calculator with the contacts of the reed switch 119 open. Moreover, owing to the stop action exerted on the respective projection 121, the bar 111 cannot be shifted by a following depression of the key 102 as long as the key 103 remains depressed.

The function keys 17 (FIG. 1) include a further function keys 123 indicated by the symbols T2, S2, −2 and +2. The operations commanded by the keys 123 are carried out on data contained in a given register. To this end, by depressing one of the four keys 123, the code bars 38, the setting-in bar 88 and the additional bar 111 (FIG. 10) are positioned in the manner hereinbefore described through the medium of the setting elements 37 and four cams 124 similar to the cam 109 and inclined to the right. Therefore, the combinations corresponding to the keys 123 are read by the electronic controller with the contacts of the reed switch 119 closed. A possible depression of the key 102 has no effect on the coding inasmuch as it confirms the shifting of the bar 111 to the left.

By depressing one of the numeric keys 16 (FIG. 1) or one of the function keys 17 not mentioned hereinbefore, the respective setting element 37, while positioning the sliders 38 and the setting-in bar 88, is engaged with a corresponding cam bottom 126 (FIG. 10) of the additional bar 111, leaving it in the rest position. Therefore, this combination is read by the controller of the calculator with the contacts of the reed switch 119 open. The subsequent depression of the key 102, on the other hand, is prevented as long as this key 16 or 17 is depressed. The depression of the key 102 prevents any subsequent depression of the numeric keys 16 or the function keys 17 owing to the action of arrest of the other cams of the bar 111 on the setting elements of these keys.

Anti-rebound circuit

The keyboard hereinbefore described has a very limited total cost. The positive positioning of the setting-in bar 88 (FIG. 2) moreover permits a considerable setting speed. On the other hand, the duration of the start pulse and the very form of this pulse, since they are not controlled by servomechanisms, depend on the speed of actuation of the keys. Immediately after the closing of the contacts of the reed switch 96, mechanical rebounds may moreover occur and would result in double introduction of the data encoded on the bars 38.

After source of introduction of erroneous data is that which occurs during the fingering action owing to a vague involuntary touching or striking. This results in the generation of very brief and erroneous start pulses, so that pulses of a duration less than a predetermined minimum should not be accepted.

Finally, erroneous data could be introduced if two keys are depressed in very rapid succession, for example in the case of the grazing of keys corresponding to adjacent codes. In these cases, likewise, in order to avoid the introduction of erroneous codes, a start pulse which is not separated from the preceding one by a predetermined minimum time interval should not be accepted.

Rebounds at the contacts moreover occur also at the reed switches 63 of the code bars 38, although these bars are positioned some time before the bar 88. In order to avoid reading the state of these last-mentioned switches when they are not stabilized in the working position, it is therefore necessary to delay further the generation of the start pulse.

The electronic controller of the machines to which the keyboard can be fitted moreover requires pulses of standardized form and duration.

Figure 12:
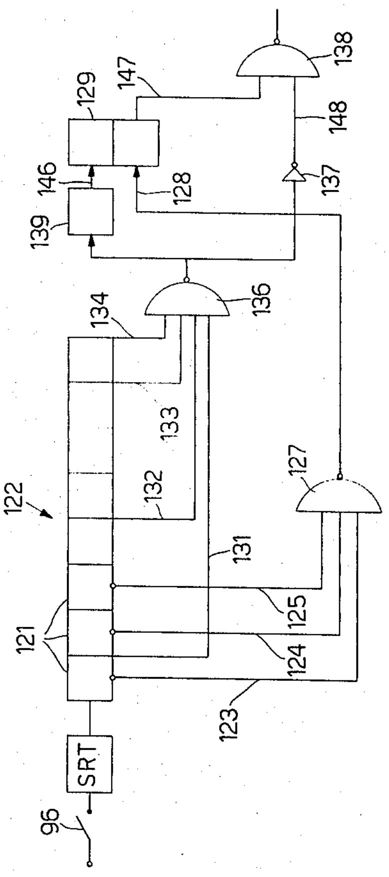
FIG. 12 shows a pluse shaping circuit associated with the keyboard embodying the invention.

On the other hand, it becomes very complex to use, on the one hand, filter circuits for accepting or refusing the erroneous introduction signals and, on the other hand, generators of start pulses which are standardized and sufficiently delayed with respect to the positioning of the code bars. The keyboard embodying the invention is therefore combined with an anti-rebound circuit shown diagrammatically in FIG. 12 which obviates all the disadvantages hereinbefore mentioned.

The anti-rebound circuit comprises a shift register 122 with eight cells each having a delay equal to To. The inverted outputs 123, 124, 125 of the first three cells 121 are connected to a NAND gate 127 the output of which is connected in turn to a reset input 128 of a flip-flop 129. The direct outputs 131, 132, 133 and 134, respectively, of the first, the fourth, the seventh and the eighth cells of the registe 122 are connected to a NAND gate 136. The output of the NAND gate 136 is connected through an inverter 137 to an input 148 of a NAND gate 138. Through the medium of a cell 139 having a delay equal to 0.5 To, the NAND gate 136 is connected to a set input 146 of the flip-flop 129. The inverted output 147 of the flip-flop 129 is connected in turn to another input of the NAND gate 138.

Figure 13:
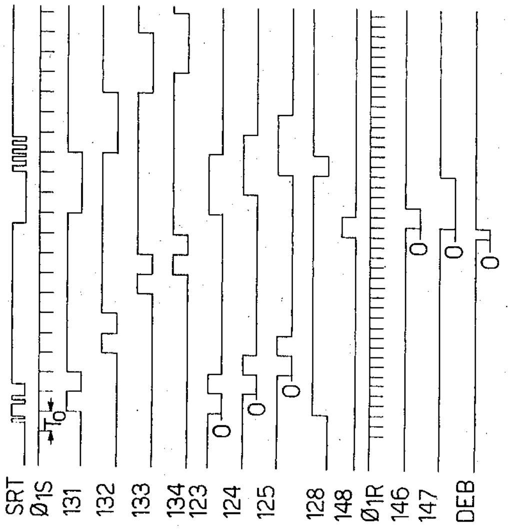
FIG. 13 shows a time diagram relating to a number of signals of the circuit of FIG. 12.

The circuit operates in the following manner: the code bars 38 (FIG. 2) having been changed over, after a certain time there is generated the signal SRT (FIG. 13) which, in its initial period, may be irregular owing to the presence of rebounds at the contacts of the reed switch 96. Assuming that the first three cells 121 (FIG. 12) of the register 122 are cleared, the inverted outputs 123, 124 and 125 are all at 1 (see also FIG. 13). The input 128 of the flip-flop 129 is at 0 and therefore the output 147 is at 1.

Since the direct outputs 131, 132, 133 and 134 are all at 0, the output of the NAND gate 136 is at 1 and the input 148 of the NAND gate 138 is at 0, so that the output signal DEB is at 1.

The input of the first signal SRT, in synchronism with a polling pulse $\phi$1S which will be described hereinafter and after a delay To, changes the output 128 of the NAND gate 127 over to 1, but does not affect the output 147 of the flip-flop 129, which remains at 1.

With the respective delays to To, 4To, 7T0, and 8To (FIG. 13), the 1 signals of the lines 131, 132, 133 and 134 arrive at the NAND gate 136 (FIG. 12), which is thus zeroized if the signal SRT lasts for more than 7To.

After a time comprised between 7To and 8To from the certain commencement of the signal SRT (FIG. 13), the change-over of the NAND gate 136 to 0 activates the input 148 of the NAND gate 138 (FIG. 12) which, together with the 1 output 147 of the flip-flop 129, brings the signal DEB to 0.

After a delay of 0.5 To with respect to the changeover of the NAND gate 136, the set input 146 of the flip-fflop 129 is zeroized, the output 147 changes to 0 and restores the signal DEB to 1. The signal DEB at 0 is therefore generated with a delay of 8 synchronization signals $\phi$1S from the certain commencement of the signal SRT and lasts for a time of 0.5 To independently of the duration of the signal SRT. The signal DEB at 0 thus generated can allow the reading of the code bars 38 (FIG. 2) to introduce the corresponding datum into store.

On the cessation of the signal SRT (FIG. 13), if the following signal SRT is generated after a time greater than 2To, the inverted outputs 123, 124 and 125 are brought back to 1 one after the other and zeroize the NAND gate 127. The flip-flop 129 is thus reset and therefore brings the output 147 back to 1, prearranging the NAND gate 138 for the generation of another signal DEB at 0.

If the signal SRT lasts for less than 7To, the NAND gate 136 is not zeroized, the input 148 of the NAND gate 138 cannot be brought to 1 and, therefore, the signal DEB at 0 for the input of the data is never generated. During the interval between two pulses, the zeroizing of the input 128 leaves the output 147 at 1.

If the following signal SRT is generated after a time of less than 2 to 3 To, the NAND gate 127 never changes to 0 and cannot reset the flip-flop 129, which maintains the inverted output 147 at 0. Even if this second signal lasts more than 8 To and the input 148 of the NAND gate 138 goes to 1, the signal DEB at 0 cannot be generated and the corresponding data entered faultily on the keyboard is not introduced into store.

Figure 14:
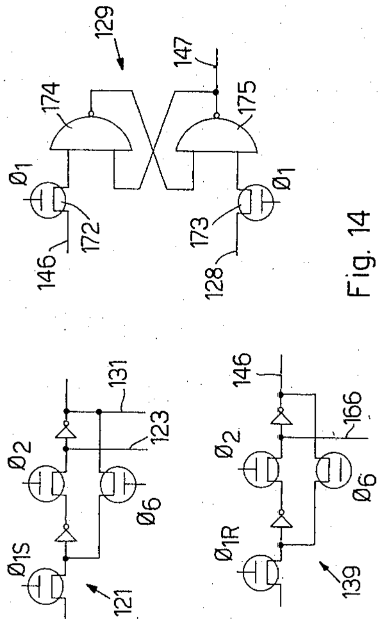
FIG. 14 shows some details of the circuit of FIG. 12.
Figure 16:
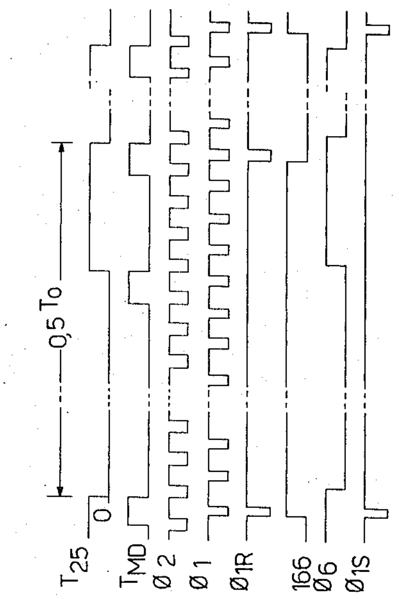
FIG. 16 is another time diagram relating to other signals of the circuit of FIG. 12.

In the event of the keyboard being employed in calculators using positive MOS logic technology, the cells 121 (FIG. 12) of the register 122 and the cell 139 adopt the arrangement of FIG. 14 in accordance with a positive static-dynamic logic known per se. In these machines there are present negative-logic synchronization signals $\phi$ 1 and $\phi$ 2 (FIG. 16) with a period equal to a bit time, which command the transfer or circulation of the corresponding data. More particularly, in a machine which can process words of 25 digis each consisting of 4 bits there is indicated by the reference T25 (FIG. 16) the signal corresponding to the transmission of the 25th digit and by the reference TMD the signal corresponding to the last bit of each digit.

Figure 15:
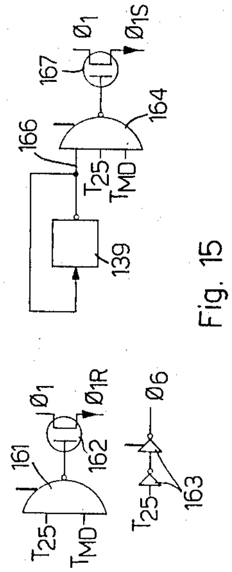
FIG. 15 shows other details of the circuit of FIG. 12.

By sending the signals T25 and to two inputs of a NAND gate 161 (FIG. 15) and connecting the output of this NAND gate to the base of the component 162, there is generated in known manner the negative-logic polling signal $\phi$ 1R (see also FIG. 16) derived from the signal $\phi$ 1 and which has a period of 0.5 To equal to the circulation time of a word.

The delayed transfer signal $\phi$ 6, on the other hand, is generated from the signal T25 through the medium of two inverters 163.

The polling signal $\phi$1S is generated by connecting the inverted output 166 of a cell 139 to an input of a NAND gate 164 together with the signals T25 and TMD. The input of the cell 139 iss connected to the same inverted output, while the output of the NAND gate 164 is connected to the base of the component 167, as a result of which the signal $\phi$1S is generated, also in known manner, at every two signals $\phi$1R.

Finally, the flip-flop 129 (FIG. 14) is constituted by two components 171 and 173 polled by the signals $\phi$1 and connected to the corresponding input of two NAND gates 174 and 175 so that the output of the NAND gate 174 is connected to another input of the NAND gate 175 and the output of the NAND gate 175 is connected to another input of the NAND gate 174 in a manner known per se.

We claim:

1. Keyboard for calculating, accounting and other office machines, comprising a series of depressible keys, a group of shiftable code bars normally located in a rest position, mounting means for shiftably mounting said code bars in two working possitions located at opposite sides with respect to said rest position and equidistant therefrom, a series of setting elements each one operable by depressing a corresponding key of said series of keys for causing said code bars to be selectively shifted from said rest position to one of said working positions to define a code combination corresponding to the depressed key, and restoring means for restoring said code bars from the reached working position to the rest position upon releasing the depressed key, whereby the force required to depress any key is constant and indipendent of the working positions reached by said code bars.

2. Keyboard as in claim 1, further comprising a setting-in bar associated with said code bars for causing the setting of the so defined code combination, positively shiftable into a working position by each of the setting elements, a positioning element arranged to normally hold said setting-in bar in an inoperative position, a common member operable simultaneously with said code bars by each of said setting elements, and connecting means connecting said common member with said positioning element for shifting said positioning element and releasing said setting-in bar upon operation of said common member prior to the action of said setting elements on said setting-in bar.

3. Keyboard as in claim 1, wherein said code bars are constituted by sliders of elongated from slidable lengthwise, each of said sliders having a series of code cams for co-operating with said setting elements, said restoring means comprising a bail pivoted on a shaft transverse with respect to said sliders, said bail having a pair of cross-pieces adapted to co-operate with corresponding shoulders of the sliders, for keeping said sliders inoperative positively, a common member being operable by each of said setting elements being provided for actuating said bail simultaneously with said sliders to release said sliders on each depression of a key.

4. Keyboard as in claim 3, wherein each key is carried by a shank slidable in a plane perpendicular to the planes of movement of said code sliders, each of said setting elements including a wire having a substantially rectilinear central portion for co-operating with a projection of said shank and with said series of said code cams and two cranked ends, further comprising a support having at least one slot perpendicular to the movement of said sliders, guiding each of said wires in correspondence of said rectilinear portion, and slot means for guiding said ends parallelly to the plane of movement of said sliders.

5. Keyboard for electronic calculating, accounting and other office machines, comprising a series of depressible keys each one connected to a corresponding setting element, a group of code bars shiftable by said setting elements in a first or a second position to define a code combination corresponding to the depressed key, a setting-in slider associated with said code bars and shiftable positively into a working position by each one of said setting elements for causing the setting of the so defined code combination, a common member operable by each of said setting elements simultaneously with said code bars, a bail pivoted on a shaft transverse with respect to said slider, a positioning element carried by said bail and slidable in a slot of said setting-in bar having a first arcuate profile substantially concentric with said shaft, so that said setting-in bar is held positively during the initial stroke of depression of the keys and is released prior to the action of said setting elements on said slider, said bail including a restoring member for bringing said code bars back to an inoperative rest position upon releasing the depressed key.

6. Keyboard as in claim 5, wherein said setting-in slider has a cam bearing edge adapted to co-operate with each of said setting elements to be shifted positively into the working position during the final stroke of said setting elements, said slot comprising a second profile substantially perpendicular to said first profile and adapted to co-operate with said positioning element during the release of said key to bring said setting-in slide back to the inoperative position, said slot being provided with a third profile adapted to co-operate with said positioning element to hold said setting-in slider positively in the working position at the end of the working stroke of each of said keys.

7. Keyboard as in claim 6, wherein said bail is provided with a stop element which is operative to prevent the return of said code bars from said first and second positions to the rest position while said setting-in slider is out of its inoperative position.

8. Keyboard as in claim 5, further comprising a group of switch means associated with said code bars and a start switch associated to said setting-in slider for generating a setting-in signal when said setting-in slider is positioned by said setting elements, and a pulse shaper for generating a start pulse of shape independent of said signal in response to the generation of said setting-in signal, said pulse shaper comprising a first checking circuit adapted to check the duration of said setting-in signal and to command said pulse shaper to generate said start pulse when said setting-in signal lasts for a predetermined minimum period of time.

* * * * *

UNITED STATES PATENT OFFICE

CERTIFICATE OF CORRECTION

PATENT NO. : 3,872,468

DATED : March 18, 1975

INVENTOR(S) : Nicolo Giolitti, Dante Daly and Lorenzo Bertino

It is certified that error appears in the above-identified patent and that said Letters Patent are hereby corrected as shown below:

Column 11, line 12 delete "from" and insert --form--.

Signed and Sealed this

*third* Day of *February 1976*

[SEAL]

*Attest:*

RUTH C. MASON
*Attesting Officer*

C. MARSHALL DANN
*Commissioner of Patents and Trademarks*